(12) United States Patent
O'Mahony et al.

(10) Patent No.: US 12,730,578 B2
(45) Date of Patent: Sep. 8, 2026

(54) DATA MIGRATION AND ASYNCHRONOUS REPLICATION WITH TRUSTWORTHY ENERGY AWARENESS

(71) Applicant: Dell Products L.P., Round Rock, TX (US)

(72) Inventors: Aidan O'Mahony, Cork (IE); Ahmed Khalid, Cork (IE); Alan Barnett, County Cork (IE); Stephen J. Todd, North Andover, MA (US)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 18/421,212

(22) Filed: Jan. 24, 2024

(65) Prior Publication Data

US 2025/0238156 A1 Jul. 24, 2025

(51) Int. Cl.
*G06F 3/00* (2006.01)
*G06F 3/06* (2006.01)
*G06F 12/00* (2006.01)

(52) U.S. Cl.
CPC .......... *G06F 3/0647* (2013.01); *G06F 3/0625* (2013.01); *G06F 3/065* (2013.01); *G06F 3/0679* (2013.01)

(58) Field of Classification Search
CPC ...... G06F 3/0647; G06F 3/0625; G06F 3/065; G06F 3/0679
USPC .......................................................... 711/154
See application file for complete search history.

(56) References Cited

U.S. PATENT DOCUMENTS 6,253,246 B1 * 6/2001 Nakatsuyama .. H04N 21/47202 348/E7.071
6,345,101 B1 2/2002 Shukla
6,351,686 B1 * 2/2002 Iwasaki ............. H01L 21/67727 700/121
7,185,138 B1 * 2/2007 Galicki ................... H04L 49/15 710/316
8,185,712 B2 * 5/2012 Sarkar ................. H04L 67/1097 711/E12.098
8,510,573 B2 8/2013 Muller et al.
9,037,672 B2 * 5/2015 Chang ..................... G06F 11/00 709/213
9,239,794 B1 1/2016 Merchant
10,394,453 B1 8/2019 Bigman
10,715,176 B1 7/2020 Singh et al.
11,829,600 B2 11/2023 Mizushima et al.
(Continued)

OTHER PUBLICATIONS

Cherubini, et al, "Data Prefetching for Large Tiered Storage Systems," 2017 IEEE International Conference on Data Mining (ICDM), New Orleans, LA, USA, 2017, pp. 823-828.
(Continued)

*Primary Examiner* — Sheng Jen Tsai
(74) *Attorney, Agent, or Firm* — Workman Nydegger

(57) ABSTRACT

Energy aware data migration and data replication is disclosed. Data stored in a source storage may be migrated or replicated to a target storage based on a migration time or replication time predicted or estimated by an awareness engine. The awareness engine may include models configured to predict the migration time or the replication time so that the migration time or replication time accounts for a cost and/or source of energy. The migration operation or replication operation is performed at the estimated migration or replication time.

20 Claims, 5 Drawing Sheets

(56) References Cited

U.S. PATENT DOCUMENTS

2002/0026543 A1* 2/2002 Tojima .................... G06F 13/30 710/22
2003/0217246 A1* 11/2003 Kubota ................ G06F 1/3275 711/170
2007/0011380 A1* 1/2007 Kawai .................. G06F 13/362 710/113
2007/0096954 A1 5/2007 Boldt et al.
2009/0100470 A1* 4/2009 Yai ..................... H04N 21/8405 725/46
2009/0135700 A1* 5/2009 Fujibayashi ......... G11B 17/228 369/85
2009/0281847 A1* 11/2009 Hamilton, II ...... G06Q 10/0637 707/E17.002
2009/0282273 A1* 11/2009 Hamilton, II ......... G06F 1/3203 713/320
2010/0070888 A1* 3/2010 Watabe ............... G06F 3/04815 705/5
2012/0106334 A1* 5/2012 Tanaka .................. G06F 13/362 370/230
2012/0303788 A1* 11/2012 Heinrich ............. H04W 72/535 709/223
2013/0275794 A1 10/2013 Annavaram et al.
2013/0339468 A1* 12/2013 Chang ..................... G06F 16/00 709/213
2015/0149130 A1* 5/2015 Chiu ....................... H02J 13/00 703/2
2015/0282039 A1* 10/2015 Park .................. H04W 52/0235 370/311
2016/0148100 A1* 5/2016 Chang .................... G06Q 50/26 706/12
2016/0344646 A1 11/2016 Wang et al.
2017/0060633 A1* 3/2017 Suarez Gracia .... G06F 11/3433
2017/0064632 A1* 3/2017 Ohshima ............ H04N 1/00214
2017/0244969 A1 8/2017 Wongpaisarnsin et al.
2018/0219965 A1 8/2018 Yellin et al.
2018/0307640 A1* 10/2018 Motai ..................... G06F 13/28
2018/0330767 A1* 11/2018 Lea ........................ G11C 11/408
2020/0167190 A1* 5/2020 Bernat .................. G06F 9/4881
2020/0185058 A1 6/2020 Song et al.
2020/0201574 A1* 6/2020 Nagata .................... G06F 3/067
2020/0311287 A1 10/2020 Kaul et al.
2020/0387518 A1 12/2020 Kesarwani et al.
2020/0401405 A1 12/2020 Lasch et al.
2020/0403633 A1 12/2020 Lasch et al.
2021/0026707 A1* 1/2021 Rosenberg .......... G06F 9/45558
2021/0300401 A1* 9/2021 Hashimoto ............ G06V 20/58
2021/0342673 A1* 11/2021 Shah ...................... G06N 3/063
2021/0342733 A1* 11/2021 Kotler .................... G06N 20/00
2021/0344549 A1 11/2021 Babington et al.
2022/0066647 A1 3/2022 Krasner et al.
2022/0210218 A1* 6/2022 Nomura .............. H04L 41/5003
2023/0122901 A1 4/2023 Wang et al.
2023/0305703 A1 9/2023 Zamir et al.
2024/0086328 A1* 3/2024 Vazhkudai .............. G06F 3/061
2024/0086711 A1 3/2024 Wilkins et al.
2024/0129380 A1* 4/2024 Ganju ................. G06F 11/3062
2024/0163251 A1* 5/2024 Karas .................... H04L 63/102
2025/0244910 A1 7/2025 Rolo

OTHER PUBLICATIONS

Shah et al, "Energy aware routing for low energy ad hoc sensor networks," 2002 IEEE Wireless Communications and Networking Conference Record. WCNC 2002 (Cat. No. 02TH8609), Orlando, FL, USA, 2002, pp. 350-355 vol. 1.

* cited by examiner

DATA MIGRATION AND ASYNCHRONOUS REPLICATION WITH TRUSTWORTHY ENERGY AWARENESS

FIELD OF THE INVENTION

Embodiments of the present invention generally relate to data migration and replication. More particularly, at least some embodiments of the invention relate to systems, hardware, software, computer-readable media, and methods for migrating and/or replicating data with energy awareness.

BACKGROUND

Data migration typically refers to the process of moving data from one system, application, or storage location to another. Data migration, more specifically in one example, includes retrieving data from storage (e.g., disks), preparing the data for transmission, and transmitting the data to a target storage. Typically, the primary factors considered in migrating data are time and policy.

Dara replication has some similarities to data migration and includes creating and maintaining multiple copies of the same data in multiple locations. Another difference between data migration and data replication is that data replication involves additional synchronization operations to ensure that various copies are synchronized with each other. Data replication is also performed based on policy concerns such as recovery point objective, cost, and latency.

Data migration and data replication incur costs related to simply migrating the data or replicating the data. In addition to the monetary cost, data migration and data replication are also associated with time and energy costs that are not considered when performing these operations.

BRIEF DESCRIPTION OF THE DRAWINGS

In order to describe the manner in which at least some of the advantages and features of the invention may be obtained, a more particular description of embodiments of the invention will be rendered by reference to specific embodiments thereof which are illustrated in the appended drawings. Understanding that these drawings depict only typical embodiments of the invention and are not therefore to be considered to be limiting of its scope, embodiments of the invention will be described and explained with additional specificity and detail through the use of the accompanying drawings, in which.

DETAILED DESCRIPTION OF SOME EXAMPLE EMBODIMENTS

Embodiments of the present invention generally relate to migrating data and/or to replicating data. More particularly, at least some embodiments of the invention relate to systems, hardware, software, computer-readable media, and methods for migrating and/or replicating data with energy awareness.

Storage systems including storage arrays are generally configured to store data. When data is migrated or replicated, the data is migrated or replicated from a source storage system (source) to a target storage system (target). While migration and replication may each include transferring data from a source to a target, replication may have additional requirements such as ensuring that the source and target(s) are synchronized, for example when data at the source changes. Migration, in contrast, may allow the source data to be deleted once the data has been migrated to the target.

Migration and replication operations require time and consume energy and embodiments of the invention relate to performing migration operations and replication operations in an energy aware manner. Embodiments of the invention advantageously improve data migration and/or replication operations by accounting for the time required to perform the compression operation, energy use, energy cost, and/or energy sources.

Figure 1:
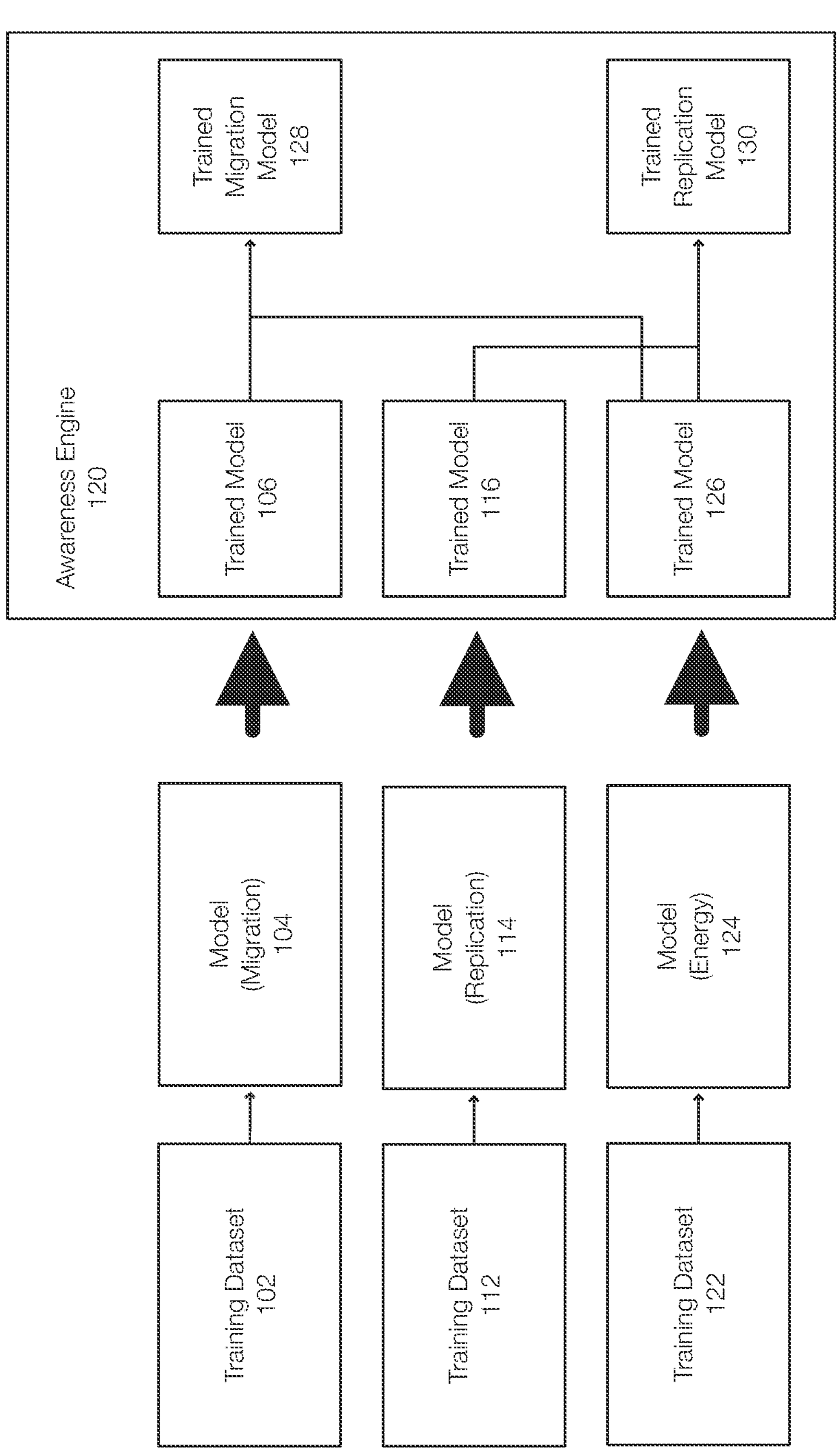
FIG. 1 discloses aspects of machine learning models configured to estimate migration and/or replication times in the context of energy sources/costs.

FIG. 1 discloses aspects of data migration and/or data replication with energy awareness. FIG. 1 illustrates a model 104, a model 114, and a model 124 that are trained, respectively, with training datasets 102, 112, and 122. The training dataset 102 includes historical data related to previously performed migration operations that can be used to train the model 104 to predict or estimate a migration time. The migration time may refer to the time required to perform the migration operation and/or to a time at which the migration operation is started. The training dataset 102 may include information (e.g., features) describing or related to data that was migrated that may include, but are not limited to, size of the migrated data, time required to migrate the data, network bandwidth/conditions, features of the source and/or the target, and the like. This information allows a trained model 106 to be generated that, for a migration operation, predicts the migration time. The trained model 106 may receive features of the source data to be migrated (e.g., size), features of the storage array, features of the target system, features of the network, or the like and the model 106 may predict or estimate a time required to migrate the source data to the target.

The training dataset 112 may include data that can be used to train the model 114. The training dataset 112 may include historical aspects of prior replication operations including data size, source information, target information, network information, synchronization information, or the like. The trained model 116, which results from training the model 114, is capable of predicting or estimating a replication time for replicating data from a source to a target or for replicating data from a source to multiple targets.

The training dataset 122 may include data that can be used to train the model 124. The training dataset 122 may include historical weather data, historical energy costs (renewable and nonrenewable), energy production data (renewable energy production, non-renewable energy production), grid contributions, and the like. The trained model 126 can, using current/forecasted weather data and/or current/forecasted renewable/non-renewable energy production data, predict, estimate, or infer a recommended energy source, cost of energy, or the like. The awareness engine 120 may use the outputs of the trained models 106 and 116 to provide recommendations regarding migration and/or replication operations. In one example, the trained migration model 128 may be a combination of (or chain of) the migration model 106 and the energy model 126. The trained replication model 130 may be a combination of (or a chain of) the trained replication model 116 and the trained energy model 126. This allows the trained migration model 128 to generate or predict a migration time that accounts for energy cost, energy source or the like. Similarly, the trained replication model 130 may predict a replication time that accounts for energy cost, energy source, or the like. More specifically, the awareness engine 120 may recommend performing the migration operation or replication operation at a time when the energy cost is low or is expected to be low. If the awareness engine 120 is able to select the energy source (e.g., when a renewable energy source is contributing to a grid), embodiments of the invention can balance migration/replication operations and energy costs. This may allow an entity to favor renewable energy even at a higher cost.

The trained migration model 128 and the trained replication model 130 can be deployed to a data source such as a storage array or to a migration/replication engine. Based on estimates or predictions from the trained migration model 128, data may be migrated at an optimal time (e.g., when energy costs are comparatively low). The trained migration model 128 may also consider other routes for the migration operation (e.g., through other hosts or nodes). The trained replication model 130 may generate predictions or estimates that all data at the source may be replicated as a suitable time that accounts for energy and other replication requirements.

Figure 2:
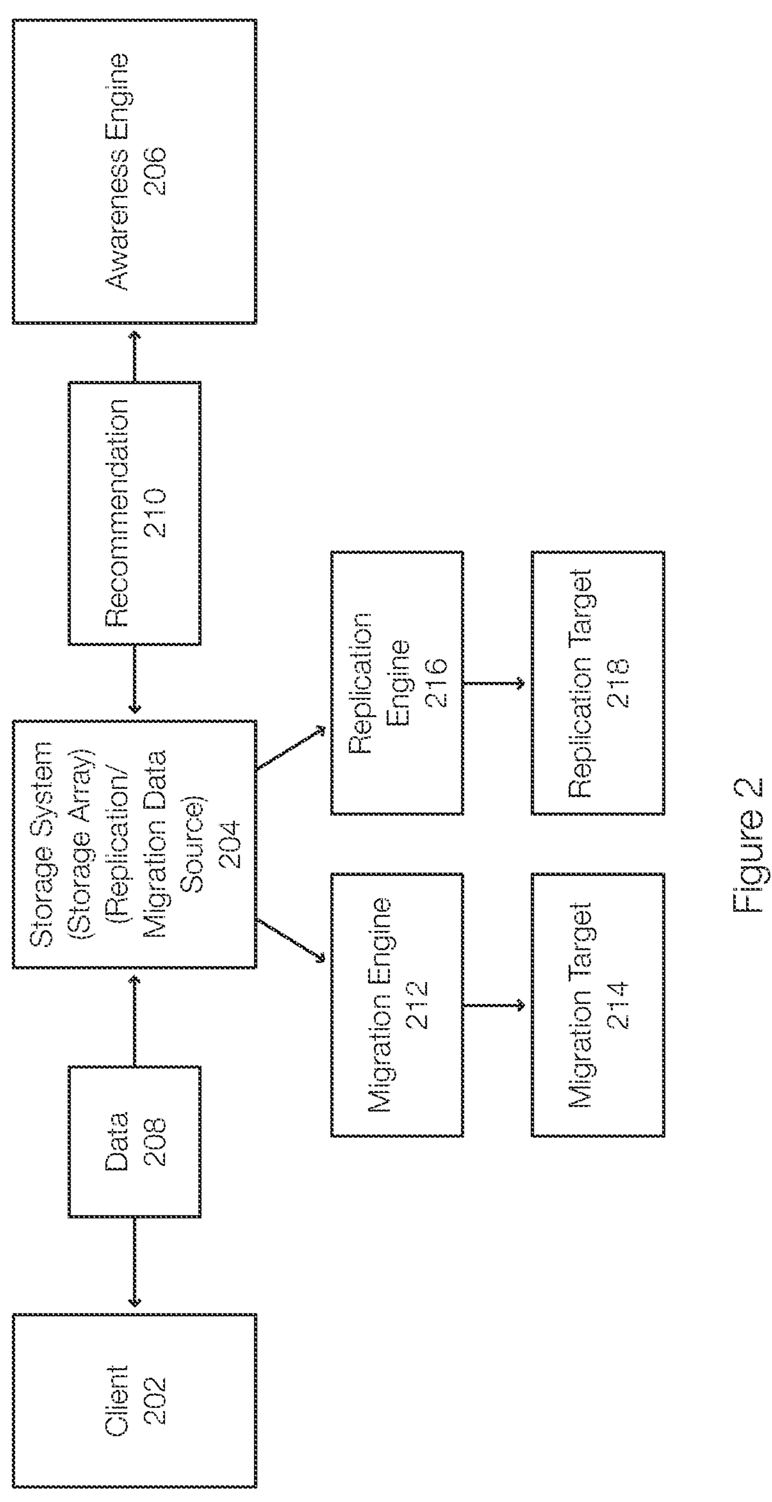
FIG. 2 discloses aspects of an energy aware data migration system and/or replication system.

FIG. 2 discloses aspects of a system configured to migrate and/or replicate data in an energy aware manner. FIG. 2 illustrates a storage system (or storage array) 204 that may receive data 208 from a client. The data 208 is stored in the storage system 204.

At some point, it may be necessary to migrate the data in the storage system to a migration target 214. The migration target 214 may be another storage array that may be remotely located relative to the storage array 204, another storage array within the same cluster, or other storage system. The migration of data from the source system 204 to the migration target 214 may be performed by a migration engine 212 and may be based on a recommendation 210 from an awareness engine 206. The awareness engine 206 may include a trained migration model that may be configured to generate an estimate or prediction of a migration time required to migrate the data to the migration target 214. The estimated or predicted migration time may also include or account for an anticipated energy cost. Using current/forecasted weather data, source array location, target array location, current/forecasted energy data, and/or other input, the trained migration model of the awareness engine 206 may enable the migration engine 212 to select the best time to perform or commence the migration operation. Weather forecasts and the like may allow the awareness engine 206 to generate multiple potential migration times/energy costs for various times. These options allow the storage system 204 to select one of the migration times and allow the storage system 204 to select a migration time that suits multiple policies including an energy policy.

For example, the awareness engine 206 may recommend an option that includes a first cost and a first migration time if the migration operation commences at noon. The awareness engine 206 may include a second option that includes a second cost and a second migration time if the migration operation commences at 2 pm. For example, the first cost may be lower than the second cost while, at the same time, the first migration time (time to perform the migration operation) is longer than the second migration time. The migration engine 212 may consider these predictions or estimates as well as other migration policies in selecting the migration time (i.e., time to commence the migration engine) generated by the awareness engine 206.

Thus, the storage system 204, or the migration engine 212, may communicate with the awareness engine 206 to obtain a recommendation 210 or inference regarding the process of migrating the data to the migration target 214. In one example, the awareness engine 206 and the migration engine 212 are part of or components of the storage system 204.

The storage system 204 may also be configured to perform a replication operation, which includes replicating, by the replication engine 216, data from the storage system 204 to the replication target 218. The replication engine 216 may also be tasked with synchronizing these replicas such that changes at the storage system 204 are also replicated to the replication target 218. The timing or time at which the replication operation begins may be determined by retrieving a recommendation 210 from the awareness engine 206, which may include a trained replication model 130. The recommendation 210 may include, by way of example only, options, each of which may include a recommended starting time, a time to perform the replication operation, and/or an anticipated energy cost. The awareness engine 206 allows the replication engine 216 to replicate the data to the replication target 218 at a suitable point in time considering energy aspects (e.g., cost, source) and other requirements or policies. Thus, the replication engine 216 may select one of the options.

The awareness engine 206 may estimate a cost of energy given current conditions (e.g., weather, location of source/target, time of day) and/or using forecasted conditions. The start time for the migration/replication operation may be the time that is expected to incur lower energy costs or use energy generated by renewable energy sources (e.g., when renewable energy is contributing to the grid), or the like. If the time at which the migration/replication operation begins is flexible, embodiments of the invention ensure that these operations are performed in an energy aware manner that accounts for, by way of example only, the energy source and/or the energy cost and/or other related policies.

Figure 3A:
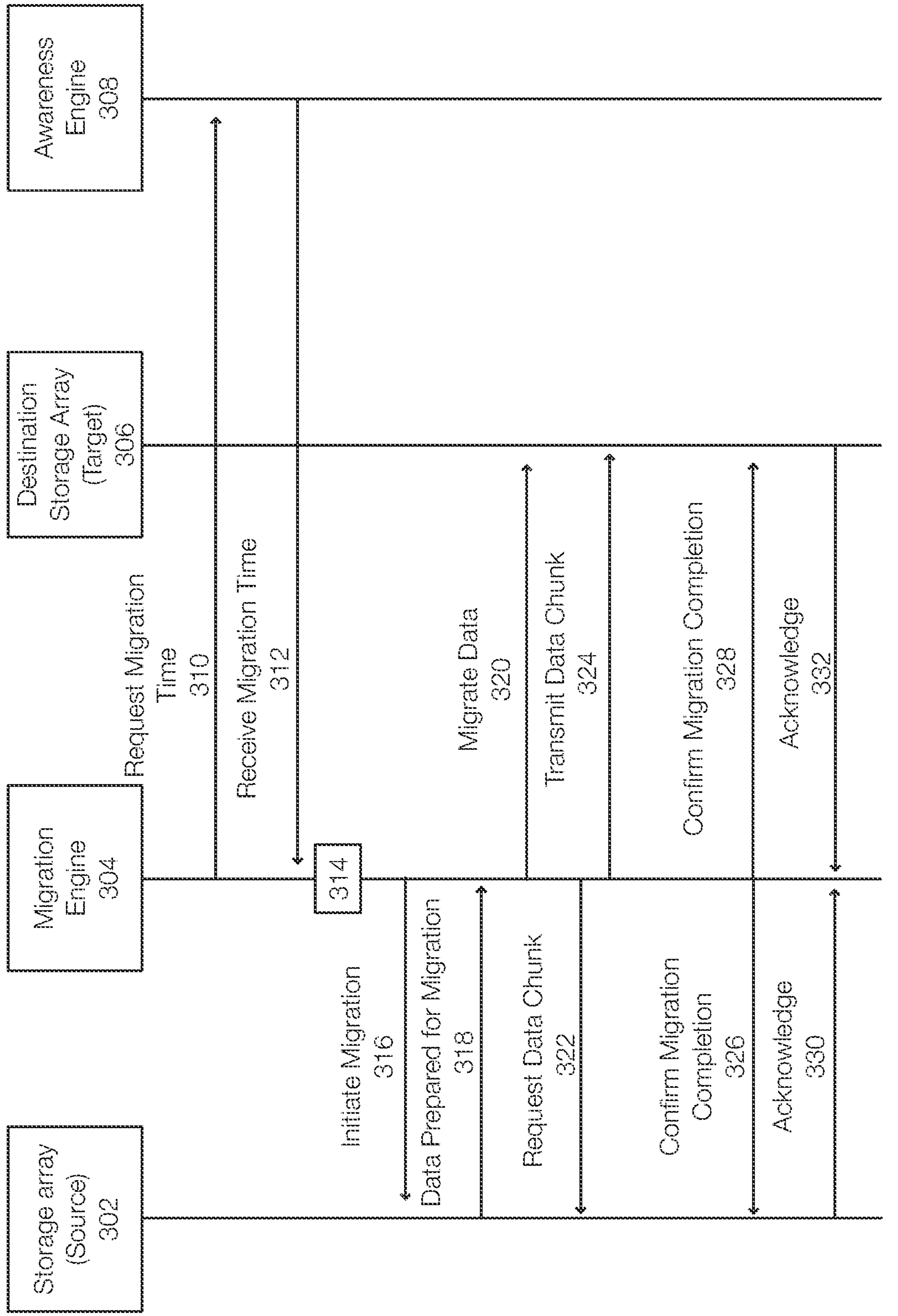
FIG. 3A discloses aspects of a method for energy aware data migration.

FIG. 3A discloses aspects of a method for performing a migration operation. FIG. 3A illustrates a storage array (source) 302, a migration engine 304 configured to perform the migration operation and which may be part of the storage array 302, a destination storage array (target) 306, and an awareness engine 308 that includes a trained migration model and/or an energy model and that may be part of the storage array 302.

When initiating the migration operation, the migration engine 304 may request a recommendation such as a migration time 310 from the awareness engine 308. The awareness engine 308 may predict or estimate a migration time (e.g., a specific starting time or a time window in which to start the migration operation). The migration time considers or is configured to account for the source data being migrated from the storage array 302, energy considerations (e.g., cost, source), and/or other migration policies and/or other aspects of the migration operation learned by the migration model.

In this example, the migration engine 304 may wait for the migration time 314 (e.g., the migration window identified by the awareness engine 308). When the migration time arrives, the migration engine 304 may initiate 316 a migration operation. The source array 302 prepares the data to be migrated and notifies the migration engine 304 when the data is prepared 318 for migration.

The migration engine 304 then migrates 320 the data to the destination storage array 306. Migrating 320 the data may include various operations that are repeated until the migration is complete. For example, the migration engine 304 may request a chunk (block, file) from the storage array 302. When the chunk is received, the chunk is transferred to the destination storage array 306. The migration engine 304 may receive an acknowledgement that the chunk has been stored in the destination storage array 306.

When the migration operation is completed, the migration engine may confirm 326 that the migration operation is completed to the storage array and receive an acknowledgement 330 from the storage array 302. The migration engine 304 may also confirm 328 with the destination storage array 306 that the migration is completed and receive an acknowledgement 332 from the destination storage array 306.

In this example, the migration time generated or predicted by the awareness engine 308 accounts for energy cost, energy source, or the like. For example, the migration time may correspond to a time during which energy costs are reduced or less expensive. This may be based on current weather conditions, forecasted weather conditions, production or forecasted energy production, or other conditions that may impact the cost of energy. In one example, the location of the energy source and/or the source/target storage arrays may also be considered. The migration time may correspond to a time when a renewable energy source is online and producing renewable energy.

Thus, the response or recommendation from the awareness engine 308 may account for the energy source and/or energy cost in providing the migration time. The response or recommendation may provide an energy assessment separately. For example, the response may identify anticipated energy costs from multiple times (multiple time windows). This allows the migration engine 304 to select a migration time that is cost-effective while also complying or accommodating other policies. For example, it may be necessary to start a migration operation within a certain time period (e.g., before midnight). Thus, the migration engine 304 will select a migration time that complies with this policy as well. The migration model, which may be trained to predict or infer energy cost based on weather data, allows the migration operation to be performed in an energy aware manner.

Figure 3B:
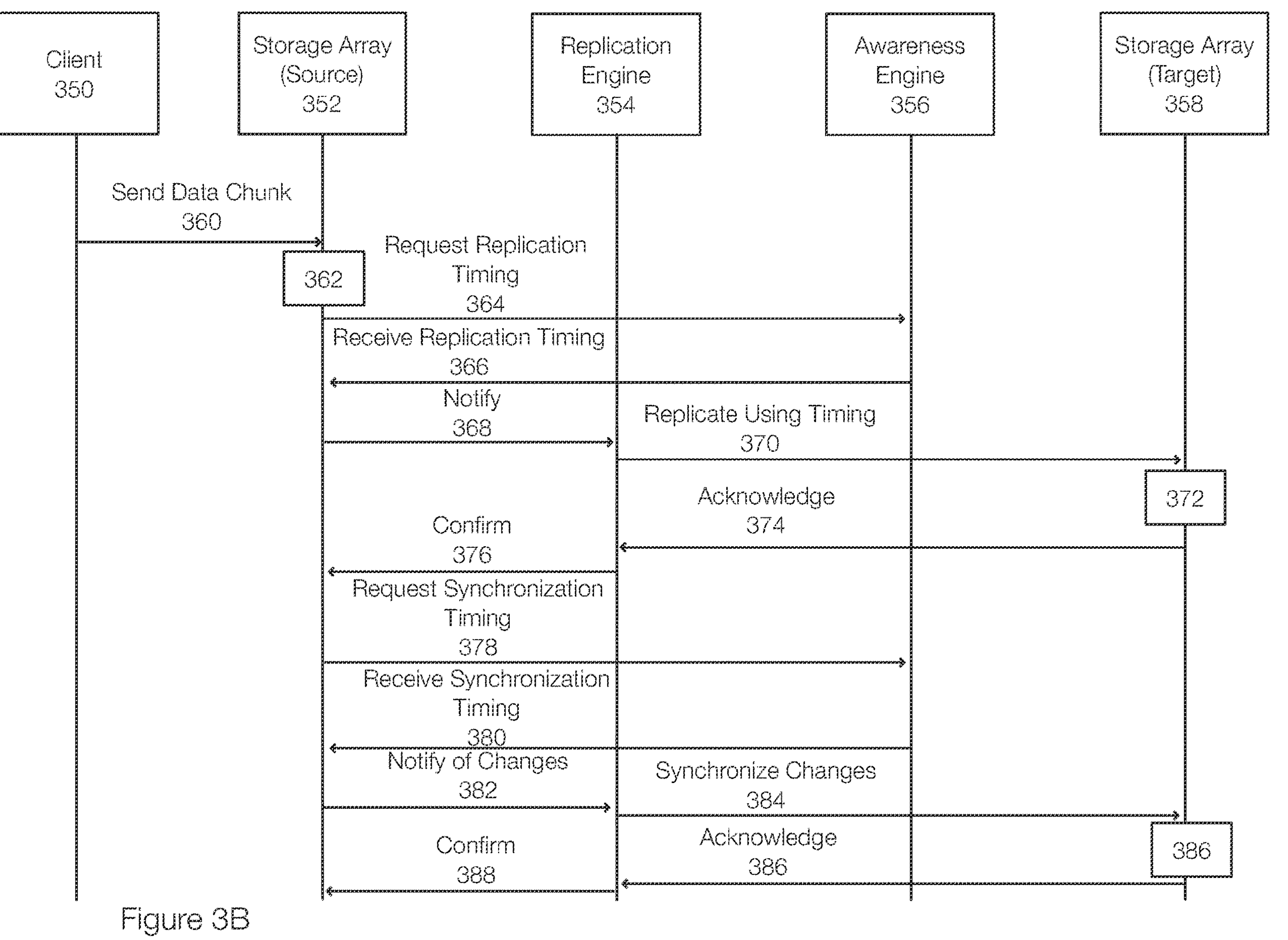
FIG. 3B discloses aspects of a method for energy aware data replication.

FIG. 3B discloses aspects of a method for performing a replication operation. In FIG. 3B, a client 350 may send 360 a data chunk to a storage array (source data) 352. The data chunk is stored 362 in the storage array 352. The storage array 352 (or the replication engine 354) requests 362 a recommendation (a replication timing) from the awareness engine 356. The awareness engine 456 may include a trained replication model configured to predict or a replication timing (e.g., time to commence the replication operation or a time window in which to commence the replication operation) that accounts for energy considerations (e.g., energy cost, energy source).

The storage array 352 receives 366 the replication timing generated or predicted by the model. At the appropriate time, the replication operation is started and the storage array 352 notifies 368 the replication engine of the replication timing and that the chunk has been stored in the storage array. Sending 360 the data chunk is representative of the fact that data may exist at the storage array 352 that should be replicated. Receiving a chunk is thus indicative that data may be continually received at the storage array 352 from the client 350 and that replication (or synchronization) is an ongoing operation.

The replication engine 354 replicates 370 the data chunk in accordance with the replication timing received from the awareness engine 356. The chunk being replicated is stored 372 in the storage array 358 (the target) and an acknowledgement 374 is provided to the replication engine 354. The replication engine 354 may confirm 376 to the storage array 352 that the chunk has been replicated to and stored at the storage array 358.

Next, the replication engine 354 may perform synchronization operations in the context of replication. Synchronization may include replicating chunks received from the client 350 to the storage array 358 or synchronizing the storage array 352 to reflect changes in the source data. When ready to synchronize data, the storage array 352 (or the replication engine 352) may request 378 a synchronization (or another replication) timing. The synchronization timing, which is an example of a replication timing, is received 380.

The storage array 352 may notify 382 the replication engine 354 that changes in the original data are ready and notify 382 the replication engine 354 of the synchronization timing. The changes are then synchronized 384 by the replication engine 354 and stored in the storage array 358. This may occur in a loop as changes in the storage array 352 are replicated to the storage array 358. The storage array 358 is updated 386 with the changes (e.g., by writing the changes to the target storage array 358). The storage array 358 may send an acknowledgement 386 that the change is committed and the replication engine 354 may confirm 388 that the replication of the changes is completed to the storage array 358.

FIG. 3B illustrates that the replication time (or synchronization time) generated or predicted by the awareness engine 356 accounts for energy cost, energy source, learned aspects of the replication operation, or the like. For example, the replication time may correspond to a time during which energy costs are reduced or less expensive or based on which type of energy sources are contributing to the grid. This may be based on current weather conditions, forecasted weather conditions, current/forecasted energy production or other data that may impact the cost of energy. In one example, the locations of the energy source, the source system, and the target system may also be considered. The replication time may correspond to a time when a renewable energy source is online and producing renewable energy.

Thus, the response or recommendation from the awareness engine 356 may also account for energy source and/or energy cost in providing the replication (or synchronization) time. The response or recommendation may, alternately, provide an energy assessment separately. For example, the response may identify anticipated energy costs from multiple times (multiple time windows). This allows the replication engine 354 to select a replication time that is cost-effective while also complying or accommodating other policies. For example, it may be necessary to start a replication operation within a certain time period. Thus, the replication engine 304 will select a replication time that complies with this policy as well. The model, which may be trained to predict or infer energy cost based on weather conditions, allows the replication operation to be performed in an energy aware manner.

As apparent from this disclosure, an embodiment of the invention may possess various useful features and aspects, although no embodiment is required to possess any of such features or aspects. Embodiments of the invention may include or relate to migration and/or replication operations, energy awareness related operations, energy aware migration and/or replication operations, or the like. Embodiments of the invention may relate to any operations related to migrating/replicating data in an energy aware manner.

Following are some further example embodiments of the invention. These are presented only by way of example and are not intended to limit the scope of the invention in any way.

Embodiment 1. A method comprising: requesting a migration time for performing a migration operation to migrate data from a source storage to a target storage, wherein the migration time is requested from an awareness engine that includes a migration model configured to estimate the migration time, migrating the data from the source to the target at the migration time, wherein the migration time determined by the awareness engine accounts for an energy cost associated with migrating the data to the target storage, and storing the migrated data at the target storage.

Embodiment 2. The method of embodiment 1, wherein the migration time comprises a migration window.

Embodiment 3. The method of embodiment 1 and/or 2, further comprising generating the migration time by inputting features including weather features, energy production features, and features of the data from the source into a trained migration module configured to predict the migration time.

Embodiment 4. The method of embodiment 1, 2, and/or 3, further comprising waiting for the migration time to arrive prior to performing the migration operation.

Embodiment 5. The method of embodiment 1, 2, 3, and/or 4, wherein the migration time is generated by a machine learning model trained on data associated with historical migration operations, historical energy costs, and factors influencing the energy costs.

Embodiment 6. The method of embodiment 1, 2, 3, 4, and/or 5, further comprising accounting for a source of energy or an estimated cost of the energy when performing the migration operation.

Embodiment 7. The method of embodiment 1, 2, 3, 4, 5, and/or 6, wherein the migration time is associated with lower energy costs.

Embodiment 8. A method comprising: requesting a replication time for performing a replication operation to replicate data from a source storage to a target storage, wherein the replication time is requested from an awareness engine that includes a replication model configured to estimate the replication time, replicating the data from the source to the target at the replication time, wherein the replication time determined by the awareness engine accounts for an energy cost associated with replicating the data to the target storage, and storing the replicated data at the target storage.

Embodiment 9. The method of embodiment 8, wherein the replication time comprises a replication window.

Embodiment 10. The method of embodiment 8 and/or 9, further comprising generating the replication time by inputting features including weather features, features of energy production and features of the data from the source into a trained replication module configured to predict the replication time.

Embodiment 11. The method of embodiment 8, 9, and/or 10, further comprising waiting for the replication time prior to performing the replication operation.

Embodiment 12. The method of embodiment 8, 9, 10, and/or 11, wherein the replication time is generated by a machine learning model trained on data associated with historical replication operations, historical energy costs, and factors influencing the energy costs.

Embodiment 13. The method of embodiment 8, 9, 11, 10, and/or 12, further comprising accounting for a source of energy or an estimated cost of the energy when performing the replication operation.

Embodiment 14. The method of embodiment 8, 9, 10, 11, 12, and/or 13, wherein the replication time is associated with lower energy costs.

Embodiment 15. The method of embodiment 8, 9, 10, 11, 12, 13, and/or 14, further comprising requesting a second replication time to synchronize changes to the data stored in the source storage and replicating the changes to the target storage at the second replication time.

Embodiment 16. The method of embodiment 8, 9, 10, 11, 12, 13, 14, and/or 15, further comprising synchronizing the target storage and the source storage based on replication times requested from the awareness engine.

Embodiment 17. A system, comprising hardware and/or software, operable to perform any of the operations, methods, or processes, or any portion of any of these, disclosed herein.

Embodiment 18. A non-transitory storage medium having stored therein instructions that are executable by one or more hardware processors to perform operations comprising the operations of any one or more of embodiments 1-15.

The embodiments disclosed herein may include the use of a special purpose or general-purpose computer including various computer hardware or software modules, as discussed in greater detail below. A computer may include a processor and computer storage media carrying instructions that, when executed by the processor and/or caused to be executed by the processor, perform anyone or more of the methods disclosed herein, or any part(s) of any method disclosed.

As indicated above, embodiments within the scope of the present invention also include computer storage media, which are physical media for carrying or having computer-executable instructions or data structures stored thereon. Such computer storage media may be any available physical media that may be accessed by a general purpose or special purpose computer.

By way of example, and not limitation, such computer storage media may comprise hardware storage such as solid state disk/device (SSD), RAM, ROM, EEPROM, CD-ROM, flash memory, phase-change memory ("PCM"), or other optical disk storage, magnetic disk storage or other magnetic storage devices, or any other hardware storage devices which may be used to store program code in the form of computer-executable instructions or data structures, which may be accessed and executed by a general-purpose or special-purpose computer system to implement the disclosed functionality of the invention. Combinations of the above should also be included within the scope of computer storage media. Such media are also examples of non-transitory storage media, and non-transitory storage media also embraces cloud-based storage systems and structures, although the scope of the invention is not limited to these examples of non-transitory storage media.

Computer-executable instructions comprise, for example, instructions and data which, when executed, cause a general purpose computer, special purpose computer, or special purpose processing device to perform a certain function or group of functions. As such, some embodiments of the invention may be downloadable to one or more systems or devices, for example, from a website, mesh topology, or other source. As well, the scope of the invention embraces any hardware system or device that comprises an instance of an application that comprises the disclosed executable instructions.

Although the subject matter has been described in language specific to structural features and/or methodological acts, it is to be understood that the subject matter defined in the appended claims is not necessarily limited to the specific features or acts described above. Rather, the specific features and acts disclosed herein are disclosed as example forms of implementing the claims.

As used herein, the term client, module, component, engine, agent, service, or the like may refer to software objects or routines that execute on the computing system or may also refer to hardware depending on context. These may be implemented as objects or processes that execute on the computing system, for example, as separate threads. While the system and methods described herein may be implemented in software, implementations in hardware or a combination of software and hardware are also possible and contemplated. In the present disclosure, a 'computing entity' may be any computing system as previously defined herein, or any module or combination of modules running on a computing system.

In at least some instances, a hardware processor is provided that is operable to carry out executable instructions for performing a method or process, such as the methods and processes disclosed herein. The hardware processor may or may not comprise an element of other hardware, such as the computing devices and systems disclosed herein.

In terms of computing environments, embodiments of the invention may be performed in client-server environments, whether network or local environments, or in any other suitable environment. Suitable operating environments for at least some embodiments of the invention include cloud computing environments, which may be remote or on-prem, where one or more of a client, server, or other machine may reside and operate in a cloud environment.

Figure 4:
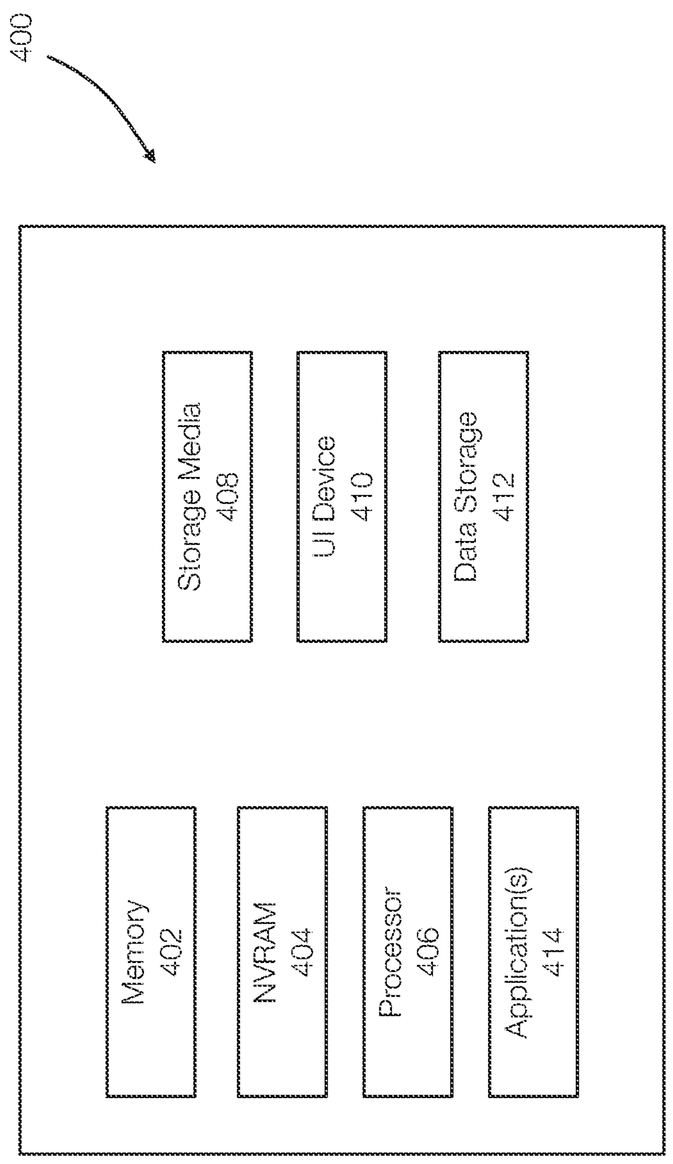
FIG. 4 discloses aspects of a computing device, system, or entity.

With reference briefly now to FIG. 4, any one or more of the entities disclosed, or implied, the Figures and/or elsewhere herein, may take the form of, or include, or be implemented on, or hosted by, a physical computing device, one example of which is denoted at 400. As well, where any of the aforementioned elements comprise or consist of a virtual machine (VM), that VM may constitute a virtualization of any combination of the physical components disclosed in FIG. 4.

In the example of FIG. 4, the physical computing device 400 includes a memory 402 which may include one, some, or all, of random access memory (RAM), non-volatile memory (NVM) 404 such as NVRAM for example, read-only memory (ROM), and persistent memory, one or more hardware processors 406, non-transitory storage media 408, UI device 410, and data storage 412. One or more of the memory components 402 of the physical computing device 400 may take the form of solid state device (SSD) storage. As well, one or more applications 414 may be provided that comprise instructions executable by one or more hardware processors 406 to perform any of the operations, or portions thereof, disclosed herein.

Such executable instructions may take various forms including, for example, instructions executable to perform any method or portion thereof disclosed herein, and/or executable by/at any of a storage site, whether on-premises at an enterprise, or a cloud computing site, client, datacenter, data protection site including a cloud storage site, or backup server, to perform any of the functions disclosed herein. As well, such instructions may be executable to perform any of the other operations and methods, and any portions thereof, disclosed herein.

The device 400 may also be representative of servers, clusters of servers, nodes, or the like. The computing resources represented by the device 400 may represent the computing resources of a cloud provider that can be allocated or used for energy aware compression operations.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method comprising:

requesting a migration time for performing a migration operation to migrate data from a source storage to a target storage, wherein the migration time is requested from an awareness engine that includes a migration model configured to estimate the migration time, wherein the migration time estimated by the migration model is a time for starting the migration operation;

wherein the awareness engine is further configured to:

generate a plurality of candidate migration times based on forecasted conditions for starting the migration operation, the forecasted conditions including environmental weather features and energy production features;

determine, for each of the plurality of candidate migration times, a predicted energy cost associated with starting the migration operation at the respective candidate migration time; and select the migration time from the plurality of candidate migration times based on a comparison of the predicted energy costs and migration policies, wherein the selected migration time is configured to minimize the predicted energy cost subject to a policy constraint;

migrating the data from the source to the target at the selected migration time; and storing the migrated data at the target storage.

2. The method of claim 1, wherein the migration time comprises a migration window corresponding to one of the plurality of candidate migration times.

3. The method of claim 1, further comprising generating the migration time by inputting features of the forecasted conditions including the weather features, the energy production features, and features of the data from the source storage into a trained migration module configured to predict the migration time.

4. The method of claim 3, further comprising waiting for the migration time to arrive prior to performing the migration operation, wherein the energy production features include availability of renewable energy from a power grid.

5. The method of claim 1, wherein the migration time is generated by a machine learning model trained on data associated with historical migration operations, historical energy costs, and factors influencing the energy costs.

6. The method of claim 1, further comprising accounting for a source of energy or an estimated cost of the energy when performing the migration operation.

7. The method of claim 1, wherein the migration time is associated with lower energy costs.

8. A method comprising:

requesting a replication time for performing a replication operation to replicate data from a source storage to a target storage, wherein the replication time is requested from an awareness engine that includes a replication model configured to estimate the replication time, wherein the replication time estimated by the replication model is a time for starting the replication operation;

wherein the awareness engine is further configured to:

generate a plurality of candidate replication times based on forecasted conditions for starting the replication operation, the forecasted conditions including environmental weather features and energy production features;

determine, for each of the plurality of candidate replication times, a predicted energy cost associated with starting the replication operation at the respective candidate replication time; and select the replication time from the plurality of candidate replication times based on a comparison of the predicted energy costs and replication policies, wherein the selected replication time is configured to minimize the predicted energy cost subject to a policy constraint;

replicating the data from the source to the target at the selected replication time; and storing the replicated data at the target storage.

9. The method of claim 8, wherein the replication time comprises a replication window corresponding to one of the plurality of candidate replication times.

10. The method of claim 8, further comprising generating the replication time by inputting features of the forecasted conditions including the weather features, the features of energy production and features of the data from the source storage into a trained replication module configured to predict the replication time.

11. The method of claim 8, further comprising waiting for the replication time prior to performing the replication operation, wherein the energy production features include availability of renewable energy from a power grid.

12. The method of claim 8, wherein the replication time is generated by a machine learning model trained on data associated with historical replication operations, historical energy costs, and factors influencing the energy costs.

13. The method of claim 8, further comprising accounting for a source of energy or an estimated cost of the energy when performing the replication operation.

14. The method of claim 8, wherein the replication time is associated with lower energy costs.

15. The method of claim 8, further comprising requesting a second replication time to synchronize changes to the data stored in the source storage and replicating the changes to the target storage at the second replication time.

16. The method of claim 8, further comprising synchronizing the target storage and the source storage based on replication times requested from the awareness engine.

17. A non-transitory storage medium having stored therein instructions that are executable by one or more hardware processors to perform operations comprising:

requesting a migration time for performing a migration operation to migrate data from a source storage to a target storage, wherein the migration time is requested from an awareness engine that includes a migration model configured to estimate the migration time, wherein the migration time estimated by the migration model is a time for starting the migration operation;

wherein the awareness engine is further configured to:

generate a plurality of candidate migration times based on forecasted conditions for starting the migration operation, the forecasted conditions including environmental weather features and energy production features;

determine, for each of the plurality of candidate migration times, a predicted energy cost associated with starting the migration operation at the respective candidate migration time; and select the migration time from the plurality of candidate migration times based on a comparison of the predicted energy costs and migration policies, wherein the selected migration time is configured to balance the predicted cost with the migration policies;

migrating the data from the source to the target at the selected migration time; and storing the migrated data at the target storage.

18. The non-transitory storage medium of claim 17, wherein the migration time comprises a migration window, further comprising generating the migration time by inputting the features of the forecasted conditions including the weather features, the energy production features, and features of the data from the source storage into a trained migration module configured to predict the migration time.

19. The non-transitory storage medium of claim 17, further comprising waiting for the migration time prior to performing the migration operation, wherein the migration time is generated by a machine learning model trained on data associated with historical migration operations, wherein the energy production features include availability of renewable energy from a power grid.

20. The non-transitory storage medium of claim 17, further comprising accounting for a source of energy or an estimated cost of the energy when performing the migration operation.

* * * * *